Figure 1:
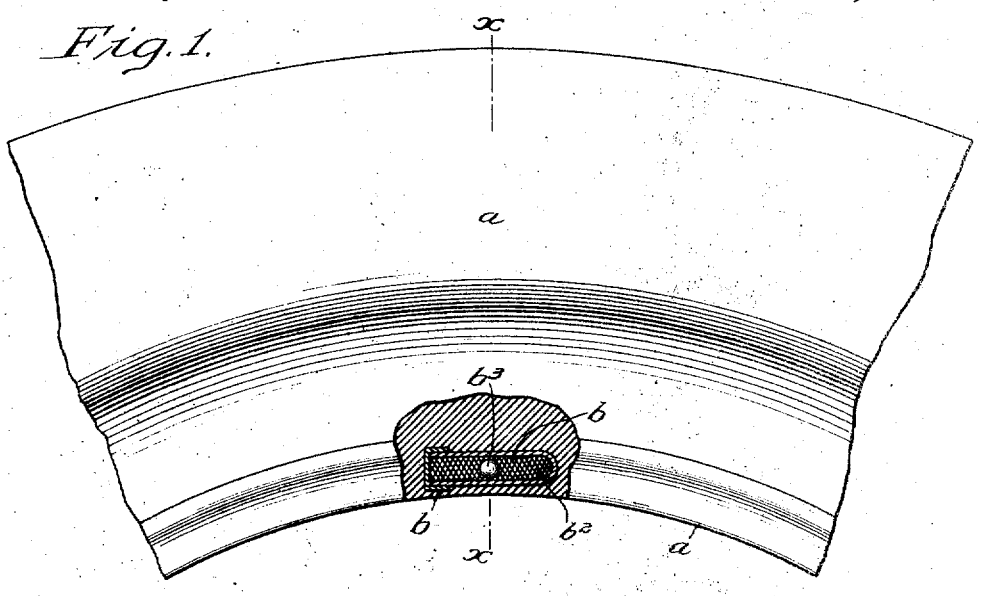

BEST AVAILABLE COPY

H. H. ROBERTS, Jr.

TELLTALE DEVICE FOR TIRES.

APPLICATION FILED MAY 13, 1918.

Reissued July 29, 1919. 14,699.

INVENTOR

Henry H. Roberts Jr.

WITNESS

F. J. Hartman

BY

Fenton & Blount

ATTORNEYS

BEST AVAILABLE COPY

UNITED STATES PATENT OFFICE.

HENRY H. ROBERTS, JR., OF PHILADELPHIA, PENNSYLVANIA, ASSIGNOR TO JOHN W. WATSON, OF WAYNE, PENNSYLVANIA.

TELLTALE DEVICE FOR TIRES.

14,699. Specification of Reissued Letters Patent. Reissued July 29, 1919.

Original No. 1,208,659, dated December 12, 1916, Serial No. 65,152, filed December 4, 1915. Application for reissue filed May 13, 1918. Serial No. 234,339.

*To all whom it may concern:*

Be it known that I, HENRY H. ROBERTS, Jr., a citizen of the United States, residing at the city of Philadelphia, county of Philadelphia, and State of Pennsylvania, have invented a new and useful Telltale Device for Tires, of which the following is a specification.

My invention has relation to a telltale device adapted to be associated with a vehicle tire whereby wear of an element or body may be utilized to ascertain the extent of use to which the tire has been subjected or the distance the same has traversed and the nature of my present invention is to provide any means adapted to be actuated by any force operating, when the device is used on a tire, to cause wear of such body, which wear may be used to indicate extent of tire use.

In the drawings, there is shown merely for the purpose of illustration, one type of mechanism for carrying this invention into practice but it is to be understood that the invention is not limited to that particular type of mechanism nor to the specific form of that type shown, nor to a mechanism actuated by any particular forces, but the invention contemplates broadly any means operated by any force or combination of forces coincident with the movement of the mechanism when fixed with relation to a tire in use for causing wear of a body which may be converted into an indication of extent of tire use.

Figure 2:
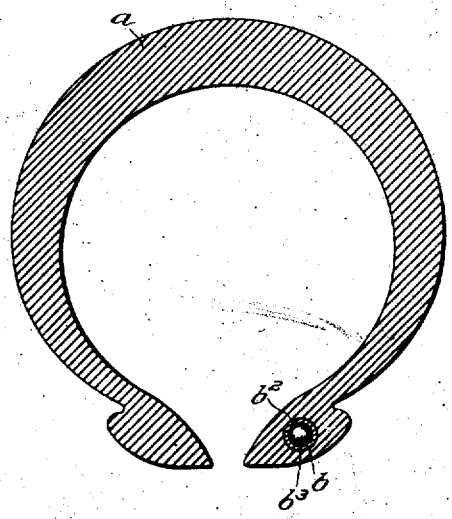
Figure 3:
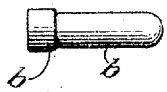

Figure 1 is a side view partly in section of a portion of a tire with one type of telltale device shown therewith, while Fig. 2 is a vertical sectional view on the line $x$—$x$ of Fig. 1. As shown in the drawings, the invention is illustrated as being applied to the shoe of a pneumatic tire. Fig. 3 is a view of the device detached.

Referring to the drawings, $a$ represents the shoe of the tire associated with which, as by being located at the rim portion thereof, may be a container $b$ which may, if used, assume various shapes and be made of any suitable material. The container $b$ is adapted for the reception of any form of body $b^3$ shown herein as a ball, the members $b$ and $b^3$ being so associated that a force generated during movement of the device with a tire when said tire is in use, will cause a relative movement between said members and effect a wear of one of the members, as the ball or body $b^3$. The wear will be proportionate to the extent of travel of the tire. It is evident that other shapes or types of body $b^3$ may be substituted for the ball $b^3$ and that this body may be made of any material suitable for the purpose. The interior of the container may be provided with a scored or roughened surface $b^2$ if desired, to cause a more rapid wear of the body $b^3$. It is also evident that this device may be located in various positions and yet the forces operating will cause wear of a member or body, which wear will indicate the extent of tire use.

Having thus described my invention, what I claim as new and desire to secure by Letters Patent is:

1. A mileage indicator for tires including means adapted to be associated with a tire to cause a member to wear during movement of the tire and thereby afford an indication of the extent of tire travel.

2. A mileage indicator for tires including coöperative members adapted to be associated with a tire and operative to cause one of said members to wear during movement of the device when attached to a tire in use and thereby afford an indication of the extent of tire travel.

3. A mileage indicator for tires including relatively movable members adapted to be so associated with a tire that a relative movement between said members, effected during tire use, causes wear of one of said members to thereby afford an indication of the extent of tire travel.

4. The combination with a vehicle tire, of means associated therewith adapted to cause wear of a body, effected by the forces generated during movement of the device with a tire in use, and thereby indicate extent of tire travel.

5. A telltale device of the character described, comprising a container with a roughened interior surface and a rolling body mounted therein, substantially as and for the purposes described.

6. Mechanism adapted to be associated with a vehicle tire including a wear-subjected element, the wear of said element affording indication of the extent of tire travel,

BEST AVAILABLE COPY

7. In a mileage indicator for tires, the employment of wear as a means to afford an indication of the extent of tire travel, said wear resulting from relative movement of contacting parts of the indicator, which movement is caused by the forces active thereon during use of the tire to which the indicator is attached.

8. In a mileage indicator for tires, the employment of wear as a means to indicate extent of tire travel, said wear resulting from friction set up by relatively movable parts which are caused to relatively move by the forces active thereon as a result of the prolate-cycloidal movement of the indicator during tire use.

9. In a mileage indicator for tires, relatively movable members so constructed and associated that their relative movement, which movement is caused by the forces active upon said members during tire use, results in progressive wear, the amount of which wear is utilized to indicate the extent of tire travel.

In witness whereof I have hereunto set my hand this 27th day of April, A. D. 1918.

HENRY H. ROBERTS, JR.